Feb. 6, 1962 E. P. BULLARD III, ET AL 3,020,097
BEARING GIB
Filed April 26, 1960

INVENTORS.
EDWARD P. BULLARD III
EDWARD P. BULLARD IV
BY Paul M. Gist
ATTORNEY

United States Patent Office 3,020,097
Patented Feb. 6, 1962

3,020,097
BEARING GIB
Edward P. Bullard III and Edward P. Bullard IV, Fairfield, Conn., assignors to The Bullard Company, a corporation of Connecticut
Filed Apr. 26, 1960, Ser. No. 24,794
4 Claims. (Cl. 308—3)

The present invention relates to plain bearing gibs, and particularly to such a gib that is capable of locking two members together that normally slide relatively to each other.

In the machine tool field, it is common practice to employ plain bearings between such members as saddles and cross rails; cross rails and bed ways; tool supporting heads and saddles, as well as other relatively movable members between which plain bearings are preferred.

It is also common practice in this art to provide tapered, wear take-up gibs between the relatively slidable members. In many instances separate binding devices were employed to lock the relatively slidable members to each other, and in some instances combined gibs and locking devices have been proposed. However, these combined gibs and locking devices were not of unitary construction and often employed flexible, inflatable bladders within the gib which acted on a shoe element in contact with one of the relatively sliding members. Furthermore, with such combined gib and locking devices, the gib structure per se is weakened by virtue of the cavity therein required to receive the inflatable bladder, and such bladders have a relatively low life expectancy.

Another objection to such structures is that they must be considerably thicker than standard gibs, and space limitations often prevent their ready employment.

The principal object of this invention is to provide a combined wear take-up gib and locking device of unitary construction.

Another object of the invention is to provide such a unitary structure in which the rigidity of the gib is not diminished by the inclusion of the locking device.

Another object of the invention is to provide such a unitary combined gib and locking device of minimum thickness.

Another object of the invention is the provision of such a unitary structure in which fluid-operated means is employed as the locking device.

Another object of the invention is the provision of such a unitary structure in which the adjustable nature of the gib is independent of the fluid-operated locking device.

In one aspect of the invention, a tapered gib of ordinary construction may include tapped holes in its one end for receiving adjusting screws for manually adjusting the gib longitudinally to effect wear take-up between two relatively slidable members. The face of the gib that may engage a stationary member may be provided with a shallow recess of substantially the entire width of the gib and of substantial length. The recess may be surrounded by walls.

In another aspect of the invention, a thin sheet of metal may be inserted within said recess and may be of a thickness equal to the depth of the recess. The peripheral edges of the sheet metal insert may be welded or otherwise fastened to the edges of the recess in a manner to provide an hermetical seal between the insert and the gib. In this way, the strength of the gib is retained and the overall thickness of the gib and insert is exactly the same as the original thickness of the gib.

In still another aspect of the invention, a narrow groove may extend axially along the recess beneath the insert, and it may be connected to a drilled or otherwise formed passage leading to the end of the gib opposite that containing the adjustment screws. A flexible supply line for fluid may be connected to the passage so that in operation, and without fluid being supplied to the groove beneath the insert, the gib acts exactly as an ordinary gib. When pressure fluid is supplied to the groove beneath the insert, the gib, in effect, expands between the relatively slidable members between which it is located, thereby clamping the two members together in locked condition.

The above, other objects and novel features of the invention will become apparent from the following specification and accompanying drawing which is merely exemplary.

Figure 1:
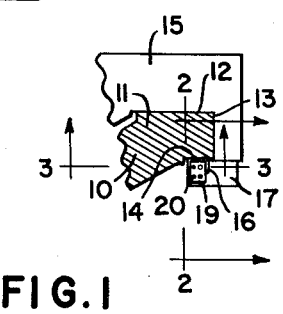
FIG. 1 is a view of a fragmentary portion of a machine tool to which the principles of the invention have been applied.

Referring to FIG. 1, the principles of the invention are shown as applied to a fragmentary portion of a machine tool including a base 10 having a way 11. The way 11 may include bearing surfaces 12, 13 and 14. A table or saddle 15 may be mounted on said base 10, and it may include bearing surfaces that cooperate with bearings 12, 13 and 14. In order to maintain proper bearing relation between the bearing 12 on the base 10 and the corresponding bearing on the saddle or table 15, an adjustable gib 16 is located between the bearing 14 and a plate 17 that may be integrally connected to the saddle or table 15.

Figure 2:
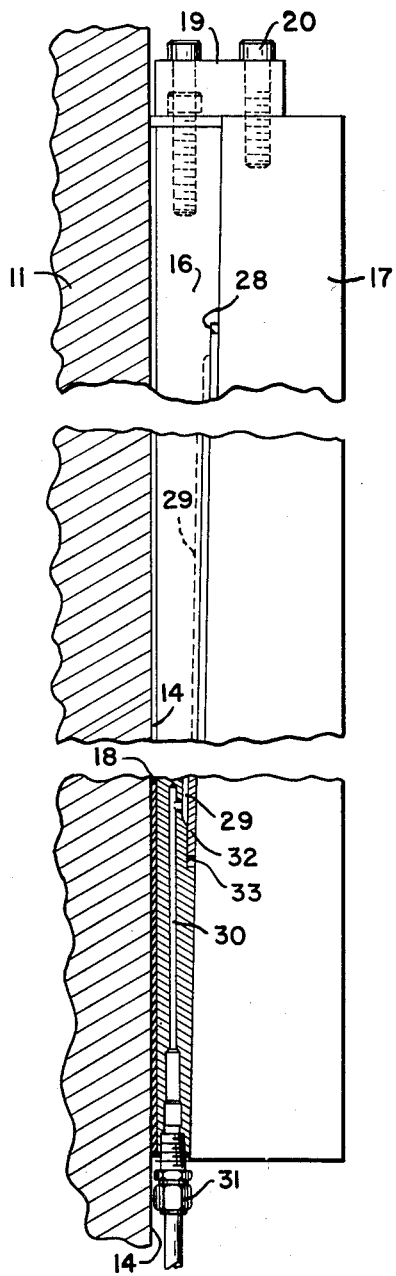
FIG. 2 is an enlarged sectional view taken substantially along line 2—2 of FIG. 1.

Referring to FIG. 2, the gib 16 may comprise a tapered element that may extend for any desired length along the length of the table or saddle 15, and in cases where the table or saddle 15 is of substantial length, gibs may be provided at each end thereof extending toward the midpoint of said saddle or table. The sliding surface of the gib 16 may or may not be provided with a desired wearing surface, and in the embodiment disclosed, the gib 16 is shown as having integrally united therewith, a wear surface 18 of a phenolic resin condensation product such as Micarta or the like.

Figure 3:
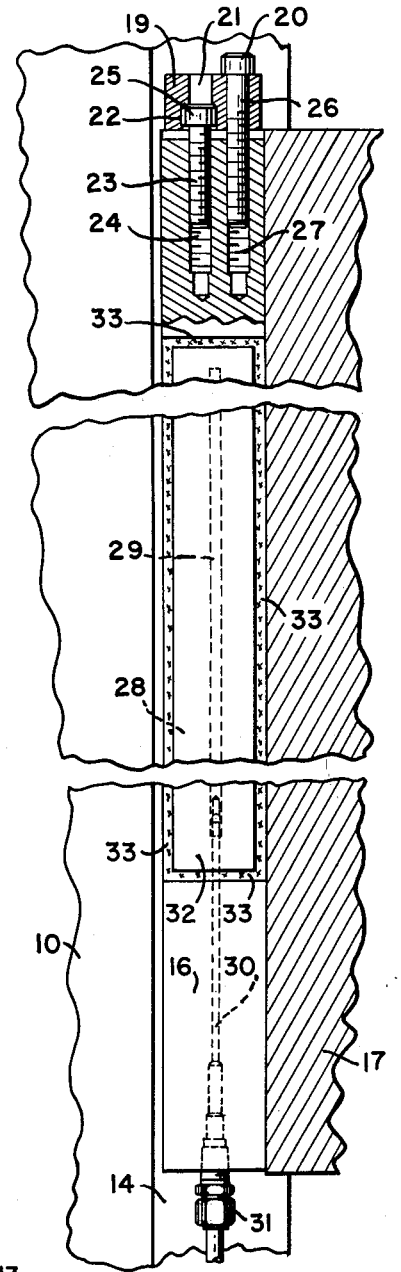
FIG. 3 is an enlarged sectional view taken substantially along line 3—3 of FIG. 1.

In order to adjust the tapered gib 16 along its longitudinal axis to thereby provide a desired bearing condition along the bearing surface 12, a plate 19 may be bolted or otherwise fastened to the plate 17 by cap screws 20. Referring to FIG. 3, the plate 19 may include a bore 21 that is provided with a counterbore 22. An Allen headed cap screw 23 may be threaded into a threaded hole 24 within gib 16 in line with the bore 21, and such that its head 25 is received within the counterbore 22.

Another Allen headed cap screw 26 may be threaded into a threaded hole 27 within gib 16 that is parallel to hole 24. The head of the screw 26 acts on the outer surface of plate 19. As shown in FIG. 3, the righthand surface of the head 25 abuts against the annular surface between the bore 21 and counterbore 22; and, the annular surface between the head and shank of screw 26 acts on the righthand surface of plate 19 rigidly holding gib 16 in an adjusted position. Turning screw 23 in a manner to provide clearance between head 25 and the annular surface between bore 21 and counterbore 22, and turning screw 26 in a direction to draw gib 16 rightwardly will loosen gib 16 relatively to bearing 14 and plate 17. Turning screw 26 so as to move gib 16 from right to left (FIG. 3) will tighten the bearing 12 and the way 11. In the latter case, screw 23 may be turned in a direction to cause its head 25 to abut the shoulder between bore 21 and counterbore 22 to lock the gib in adjusted position.

The gib 16 may include a shallow recess 28 that may extend for a substantial distance along gib 16 and substantially for the full distance thereacross. A narrow groove 29 may extend longitudinally along the bottom of the recess 28, and a passage 30 may extend from the recess 28 to the one end of the gib 16. A pressure liquid fitting 31 may be connected to the passage 30 for supplying fluid under pressure to the recess 28 for a purpose to be described later.

A sheet metal insert 32, having a thickness equal to the depth of the shallow recess 28, may be received therewithin and completely fill said recess. A welded joint 33 may be provided about the periphery of the insert 32 and the outer edges of the recess 28 so as to provide an hermetically sealed joint between the peripheries of the insert 32 and recess 28. In this way, the inherent rigidity of a solid gib is retained while at the same time providing a fluid-operated binding device for locking the two relatively slidable members 15 and 10 together.

Introducing pressure liquid to the passage 30 causes the sheet metal insert to expand slightly against the plate 17, thereby locking the table or saddle 15 to the base 10.

Although the various features of the combined adjustable gib and hydraulic binding device have been shown and described in detail to fully disclose one embodiment of the invention, it will be evident that changes may be made in such details and certain features may be used without others without departing from the principles of the invention.

What is claimed is:

1. A combined bearing gib and clamping device for a machine tool comprising a tapered gib located between a stationary member and a movable member adapted to be moved along said stationary member; means for adjusting said tapered gib to compensate for wear between said stationary and movable members; a shallow recess of substantial area within one face of said gib; a thin flexible sheet of metal completely filling said recess; an hermetical seal about the peripheries of said recess and said flexible sheet; a passage within said gib; means for establishing communication between said passage and the inner surface of said flexible sheet of metal; and means for supplying pressure fluid to said passage.

2. A combined bearing gib and clamping device for a machine tool comprising a tapered gib located between a stationary member and a movable member adapted to be moved along said stationary member; means for adjusting said tapered gib to compensate for wear between said stationary and movable members; a shallow recess of substantial area within one face of said gib; a thin flexible sheet of metal completely filling said recess; an hermetical seal about the peripheries of said recess and said flexible sheet; a groove extending longitudinally along the bottom of said recess; and means for introducing pressure fluid into said groove.

3. A combined bearing gib and clamping device for a machine tool comprising a tapered gib located between a stationary member and a movable member adapted to be moved along said stationary member; means for adjusting said tapered gib to compensate for wear between said stationary and movable members; a shallow recess of substantial area within one face of said gib; a thin flexible sheet of metal completely filling said recess; an hermetical seal about the peripheries of said recess and said flexible sheet; a passage within said gib; means for establishing communication between said passage and the inner surface of said flexible sheet of metal; means for supplying pressure fluid to said passage; and a non-metallic wearing surface element fixed to said gib.

4. A combined bearing gib and clamping device for a machine tool comprising a tapered gib located between a stationary member and a movable member adapted to be moved along said stationary member; means for adjusting said tapered gib to compensate for wear between said stationary and movable members; a shallow recess of substantial area within one face of said gib; a thin flexible sheet of metal completely filling said recess; an hermetical seal about the peripheries of said recess and said flexible sheet; a groove extending longitudinally along the bottom of said recess; means for introducing pressure fluid into said groove; and a non-metallic wearing surface element fixed to said gib.

References Cited in the file of this patent

UNITED STATES PATENTS

| | | |
|---|---|---|
| 1,425,979 | Kingsbury | Aug. 15, 1922 |
| 2,768,406 | Carle | Oct. 30, 1956 |